United States Patent
Abouodah (12)

(10) Patent No.: US 6,557,633 B2
(45) Date of Patent: May 6, 2003

(54) IN-WELL CONTAMINANT STRIPPER

(76) Inventor: Mohamed Abouodah, P.O. Box 2697, Olathe, KS (US) 66063

( * ) Notice: Subject to any disclaimer, the term of this patent is extended or adjusted under 35 U.S.C. 154(b) by 0 days.

(21) Appl. No.: 09/971,465

(22) Filed: Oct. 5, 2001

(65) Prior Publication Data

US 2003/0066647 A1 Apr. 10, 2003

Related U.S. Application Data

(63) Continuation of application No. 60/270,549, filed on Feb. 21, 2001.

(51) Int. Cl.⁷ .............................................. E21B 43/18
(52) U.S. Cl. .................. 166/265; 166/370; 166/372; 166/374; 166/68.5; 166/105; 166/405; 166/52
(58) Field of Search .......................... 166/265, 370–375, 166/53, 68.5, 105, 68; 405/52, 258

(56) References Cited

U.S. PATENT DOCUMENTS 4,842,748 A * 6/1989 Agnihotri et al.
4,979,886 A * 12/1990 Rippberger
5,271,467 A * 12/1993 Lynch

* cited by examiner

*Primary Examiner*—Roger Schoeppel
(74) *Attorney, Agent, or Firm*—Spencer Fane Britt & Browne LLP

(57) ABSTRACT

A method and apparatus is provided for removing contaminates, in particular, volatile organic contaminates from groundwater by providing a well that combines air stripping and air sparging apparatus within a single well to provide in-ground treatment of contaminated groundwater.

10 Claims, 4 Drawing Sheets

IN-WELL CONTAMINANT STRIPPER

FIELD OF THE INVENTION

The present invention relates to an apparatus and method for remediation of groundwater. In particular, an apparatus and method is provided for in ground or in-situ removal of contaminates from groundwater comprising a combination of air stripping and air sparging within the same apparatus.

BACKGROUND OF THE INVENTION

During the past forty years, it has become recognized that the use of organic compounds by society, and the disposal of those organic compounds, has had a deleterious effect on groundwater supplies. Contamination of groundwater is most commonly the result of spills and leaks from storage facilities or surface discharges of contaminants with the contaminates leaching into the groundwater over time. The most common types of contaminates are petroleum products and organic compounds incorporating various percentages of chlorine moieties on the molecule. In general, these compounds are referred to as volatile organic compounds (VOCs). The term VOCs is loosely used to include a wide range of organic contaminates which present a sufficiently high vapor pressure to allow various types of gas/liquid partitioning methods to be applied in the removal of the contaminates from an environmental system such as groundwater.

One prior art technique of clearing VOCs from groundwater has been the use of ex-situ air stripping of contaminates. In the ex-situ methodology, a contaminated environmental system such as groundwater, or a pond (aboveground water), is pumped to the ex-situ air stripping (EAS) facility where it is treated. The treated groundwater is then disposed of by known methods.

The basic idea in the operation of air stripping is that the substance, in this case, groundwater, containing the VOCs is sprayed into the air of a closed system. The spraying reduces the groundwater to small drops or particles, thus, significantly increasing the exposed surface area of the contaminated water. This increased surface area of the contaminated water increases the amount of water surface area that is in direct contact with the air of the surrounding environment. The increased surface area contact enables a greater amount of the VOCs contained in the water to be released from the water and to be absorbed into the adjacent air. This type of redistribution of a volatile compound is generally known as partitioning, or gas-liquid partitioning, of volatile compounds.

Gas-liquid partitioning is based on the fact that any volatile compound will redistribute itself between a liquid layer and gas layer to achieve an equilibrium state between the two layers. The equilibrium achieved is dictated by the particular physical properties of the volatile compound and the particular gas and particular liquid which make up the partitioning system. Since the redistribution between the gas and liquid phases is a constant factor basis based on the partition coefficient K of the system, the contaminated phase, in this case, groundwater, can be repeatedly exposed to air that contains less of the contaminate than the water, and by repeated exposure air, the contaminate can be drawn out of the water and the water contamination reduced to safer levels.

Typically, in an EAS operation, contaminated groundwater is pumped out of the ground to a treatment facility, treated and then discharged. The drawback of EAS water treatment is not in the effectiveness of the EAS process as air stripping towers can be designed which remove up to 99.9 percent of a contaminate from groundwater. The difficulty in EAS is the cost and success of extraction of the contaminated groundwater from the subsurface area. The extraction of the contaminates with the groundwater presents a difficulty as the contaminates within the groundwater can either be adsorbed under the soil, or the contaminates may exist in solution within the groundwater, or the contaminates may occur near the bottom of the groundwater layer as a result of the density of the contaminate being greater than the density of water. Another problem presented with simply extracting all groundwater containing the contaminates is that groundwater moves within the ground, and the contaminate suspended in the groundwater can become isolated in areas denominated as "the dead zone." The dead zone, in groundwater terminology, refers to pour spaces that are not connected with the general body of groundwater. Once contaminates have become located or isolated within pour spaces, or voids, in the soil, it is difficult to flush the contaminates out of these isolated pockets. Therefore, ex-situ air stripping of contaminated aquifers, or groundwater, may require thirty years or more of effort to achieve acceptable levels of contaminate reduction.

The second drawback associated with EAS is in the pumping of large volumes of groundwater out of the ground and to a treatment facility. Clearly, the movement of such large volumes of water over long periods of time attaches a very high cost to ex-situ air stripping of contaminates from groundwater. In view of the large volumes of water that must be pumped to the surface and treated, and adding to this cost the long lifetime of the project, the personnel costs over decades of treatment, monitoring and maintenance of the apparatus, such ex-situ air stripping projects can present unbearable costs.

An alternative method of groundwater remediation is known as air sparging. Air sparging is roughly similar to air stripping in concept in that the basis of operation is gas-liquid phase partitioning of the organic compound. In air sparging, air is bubbled under pressure through a contaminated aquifer. The air bubbles travel through the groundwater and adjacent soil during which time the organic compound is partitioned between the air and the liquid. The air bubbles then migrate to a vapor extraction area where the now contaminated air is removed. Typically, air sparging is operated on an in-situ basis by drilling multiple wells in the area of the contaminated groundwater, inserting air bubbling apparatus down into the well and forcing air or another gas into the contaminated aquifer. The injected gas rises through the water at the well site and is drawn off at the well head by a low-level vacuum.

In comparison to EAS, air sparging presents a number of advantages. In the use of air sparging, all groundwater treatment is performed in-situ, thus eliminating the pumping costs associated with EAS. Air sparging methodology treats the contaminates as they are found within the aquifer or groundwater thus eliminating the additional above-ground treatment facility apparatus. It will be appreciated that with EAS, wells must be initially drilled to extract the contaminated groundwater. The ex-situ nature of air sparging reduces operation and maintenance costs as the treatment facility is essentially located within the ground. Another advantage of air sparging is that it involves the injection of the oxygen of air into the subsurface water, thereby presenting opportunities for enhanced bio-degradation through oxidation as a result of the increased oxygen concentration within the groundwater.

SUMMARY OF THE INVENTION

An apparatus and method of removing contaminates from groundwater is provided which combines air stripping technology and air sparging technology into a single in-ground water well. The present invention combines the advantages of air sparging for the removal of VOCs with the advantages of air stripping while avoiding the high costs associated with the pump and treat methods of air stripping of contaminated groundwater.

The present invention provides for introduction of air or gas under sufficient pressure to enable release the gas into the well water pool and to allow the gas bubbles formed to travel upwardly through the well water pool. During this gas movement VOCs are partitioned between the liquid phase, in this case contaminated well water, and the gas phase which is the injected air or gas. The present invention further comprises the pumping of contaminated water from the well water pool to the atmosphere or area above the water pool at which point the contaminated water is sprayed into the well head area atmosphere to allow the sprayed droplets of contaminated well water to contact the well head air or gas. This permits the VOCs in the contaminated well water to become partitioned between the water droplet and the surrounding well head atmosphere. During use of the inventive method both the air sparging component and the air stripping component are applied and the resulting contaminated air or gas in the well area is drawn off from the well head by a low pressure vent or vacuum vent that is attached to the well casing. The removed air or gas is collected and the VOC's are removed from the air or gas stream.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
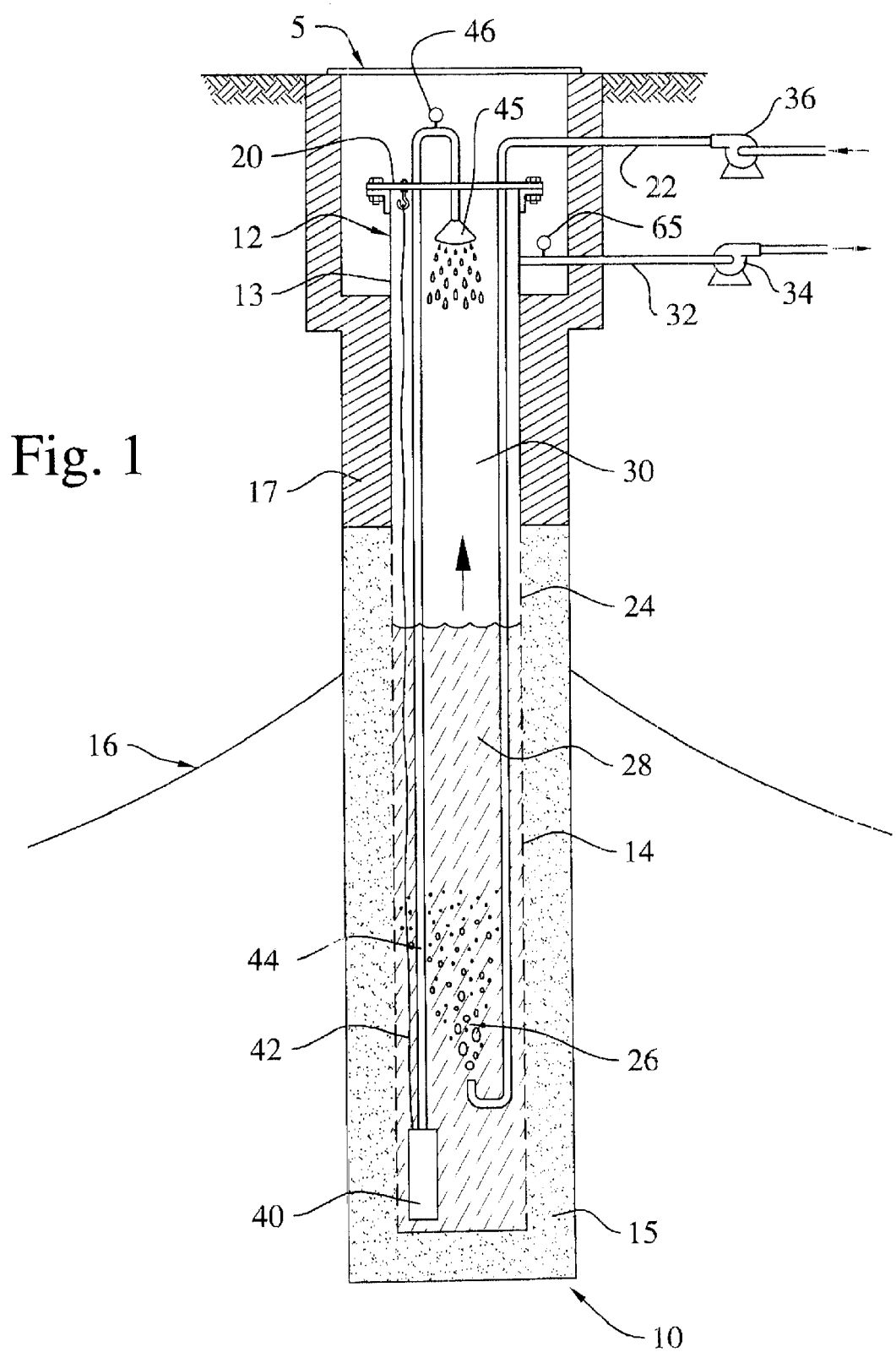
FIG. 1 is an elevation view of a water well containing the apparatus of the present invention.

Referring now to FIG. 1, the present invention is shown which, in general, can be said to resemble an air stripping tower that has been located within a groundwater well, and which combines with the air stripping component and in-situ air sparging component. Formation of the present invention is accomplished by first drilling a well hole 10 in the vicinity of the contaminated groundwater. Well hole 10 is of sufficient depth to reach the underground aquifer or water table. Once hole 10 is drilled, a casing 12 is inserted into the hole. Casing 12 is generally provided with a portion having a solid wall 13 and a portion having a permeable or perforated 14. Once well casing 12 is in place, the area of hole 10 that is adjacent permeable or perforated casing 14 is filled with sand or gravel 15 or another suitable material which will allow water to pass from water table 16 and into well casing 12. Gravel or sand 15 is used to both prevent collapse of the walls of hole 10 and to keep casing 12 stable within drill hole 10. After sand or gravel 15 has been packed into hole 10 about casing 12, the upper area of hole 10 that is adjacent to the solid wall portion 13 of casing 12 is filled with grout or some other material which will solidify around casing 12 and prevent contaminated surface water from draining into well 5. Screen 28 in positioned around permeable casing 14 to prevent entry of sand and particles into well water pool 24. After well to hole 10 has been excavated and casing 12 has been fixed into well hole 10, the components which affect the air sparging and air stripping of contaminants from the groundwater can be installed into well 5.

Still referring to FIG. 1, the air sparging component of the present invention is provided by inserting a three-quarter inch PVC pipe 22 through lid 20 of well casing 12 and extending pipe 22 down into well water pool 24 of well 5. In a preferred embodiment air sparging pipe 22 is three-quarter inches in diameter, however, alternative pipe sizes can be used depending upon the size of the well and the strength of blower 36 attached to pipe 22. Once in place in well 5, air or a selected gas is forced into pipe 22 by blower 36 to accomplish injection of gas or air into water pool 24. Blower 36 and pipe 22 should be sized to accomplished sufficient air pressure in pipe 22 to overcome the water pressure of water pool 24 against the submerged end of pipe 22.

Pipe 22 is inserted to a sufficient depth within well water pool 24 to allow gas 26, usually air, to bubble up through a substantial portion of the volume of well water pool 24 contained within well casing 12. As air bubbles 26 rise through well water pool 24, the VOCs that are contained within well water pool 24 partition between the gas and liquid components, in this case, air bubbles and water, with a portion of the VOCs being carried by the air bubbles or gas bubbles 26 to the surface of well water pool 24. The air gas bubbles 26 then are released into the atmosphere above well water pool 24, which resides in the head area 30 of well casing 12.

It will be appreciated that as air bubbles 26 pass through the well water pool 24 in well casing 12, the air absorbs or attracts a portion of the VOCs that are contained in the water pool 24. The amount of VOCs which become dissolved in the air or gas, and thus are removed from the water, is dependent primarily on the partitioning equilibrium which is achieved between the vapor and liquid phase. This equilibrium is dependent upon the particular organic constituent or contaminant that is present in the water pool 24. Typical VOCs which are most successfully removed using air sparging are the lighter types of petroleum constituents, such as benzene, ethyl benzene, toluene and xylene. Air sparging is less useful with heavier organic compounds and petroleum products such as diesel fuel and kerosene.

Figure 4:
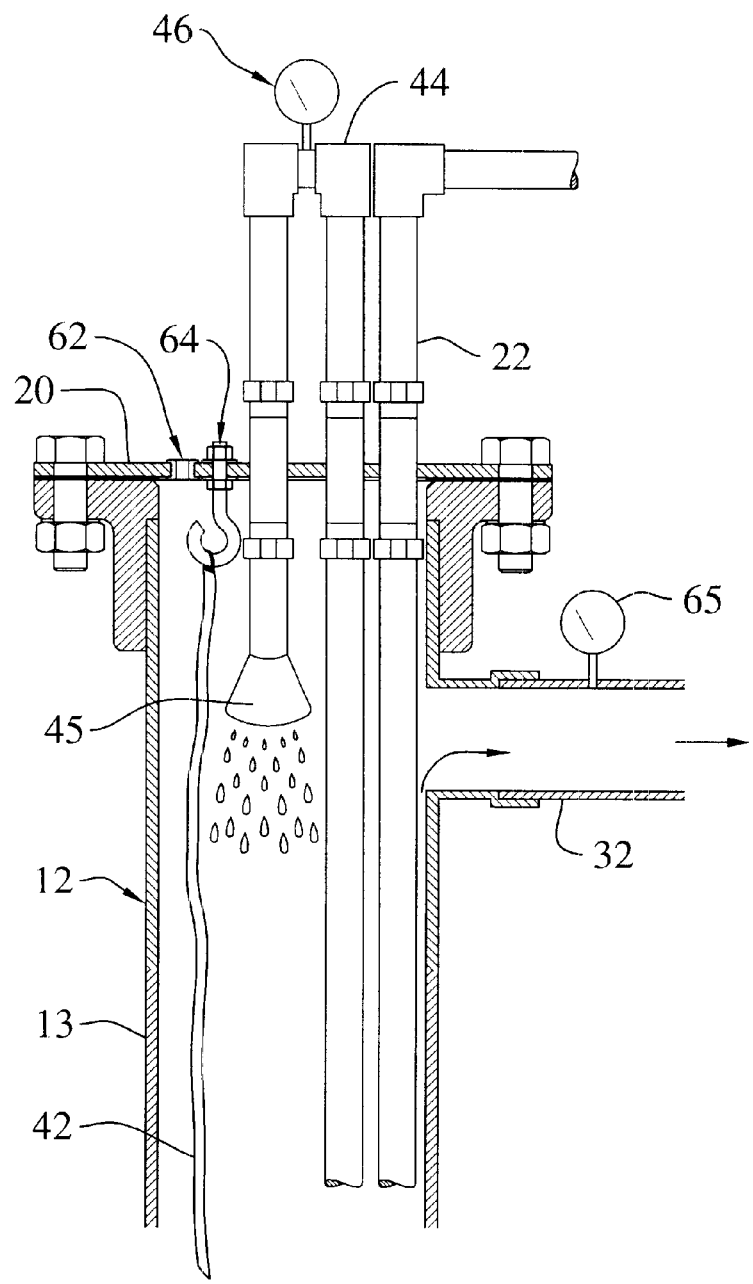
FIG. 4 is an enlarged detail view of the apparatus installed in the water well of FIG. 2 specified by the broken line in FIG. 2.

Once bubbles 26 have traveled through well water pool 24 and the VOCs contained in well water pool 24 have become partitioned between water 24 and gas bubbles 26, the gas bubbles will rise out of water pool 24 and be pulled upwardly and out of well 5 by low pressure takeoff vent 32, which is connected to fan or vacuum pump 34. The pressure in vent 32 can be monitored by vacuum gage 65 (FIG. 4). After the air or gas phase is removed from well head area 30 via vent 32, the gas can be discharged to the atmosphere or treated in accordance with regulatory requirements.

As just described, during the process of air sparging, a low pressure vent or vacuum takeoff 32 of the gases from well 12 is utilized. As a result of this vacuum or low pressure, a degree of suction is presented to the surface of well water pool 24, which results in mounding of the water pool 24 at the well and at portions of water table 16 which is adjacent to well 5. This mounding of the water creates a lifting of the water table and results in an area of lower gradient pressure which enlarges the radius of influence of the well. In the present invention the mounding, or reduction in well head area, is enhanced by the use of both sparging and a reduced pressure or vacuum venting of well 5.

Figure 2:
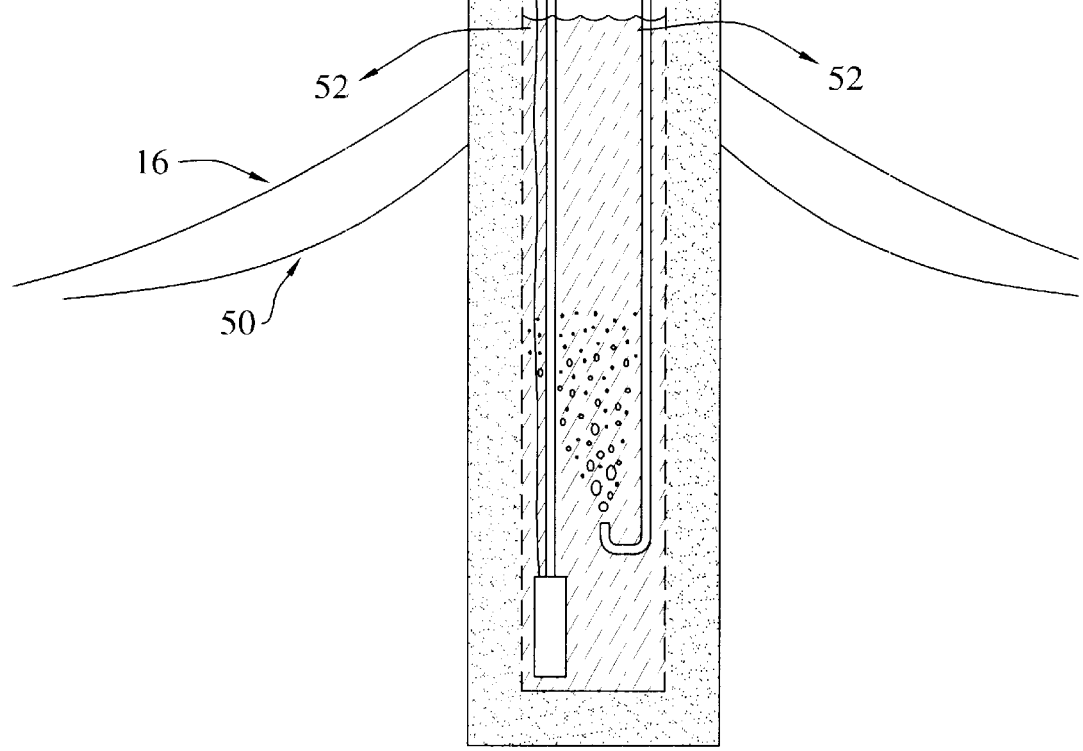
FIG. 2 is an elevation view of the water well of FIG. 1 and showing the change in the water table near the well as a result of the operation of the present invention.

Referring now to FIG. 2, the mounding of the water table due only to sparging is shown as water table level 50. The addition of vacuum pressure to the effect of sparging on the water table increases the mounding as is shown by the water table lever 16. This is advantageous to the operation of the present invention as the increased mounding assists in directing the treated water which falls into the top of water pool 24 outwardly and away from well 5 as indicated by Arrows 52.

The second component of the present invention which is utilized in groundwater remediation is an in-situ air stripping component. Again referring to FIG. 1, the air stripping component is comprised of pump 40 which is inserted into well 5 and supported above the bottom of well 5 by wire or chain or 42, which is connected to lid 20. Pump 40 can either be pneumatic or it can be an electric pump. In either case, the pneumatic pressure line or the electrical line which is used to supply energy to pump 40 will, for convenience and security, be attached to support line or chain 42 which is attached to lid 20 by hook 64 (FIG. 4). The electrical line can exit lid 20 through aperture 62 (FIG. 4) in lid 20. Also connected to pump 40 is water line 44, which extends upwardly from pump 40 to deliver water from water pool 24 to dispersion head 45, which is located at the opposite end of water line 44. Attached to water line 44 is pressure gauge 46, which is used to monitor the operation of pump 40 from outside the well casing.

During operation of the air stripping component of the present invention, water from well water pool 24 is taken in by pump 40 and pumped through water line 44 and past pressure gauge 46 to dispersion head 45, at which point the water from well water pool 24 is sprayed into the atmosphere contained in head area 30. As the contaminated water from well water pool 24 is sprayed from dispersion head 45, the droplets of water contact the air or gas which is contained in head area 30 and partitioning of the VOCs contained in the water sprayed from dispersion head 45 into the air or gas contained in head area 30 occurs. It will be appreciated by those skilled in the art that a portion of the gas contained in head area 30 already contains VOCs as the result of the gas bubbles 26 emanating from air sparging tube 22. Since it cannot be completely assured that air bubbles 26 which are emitted from the surface of well water pool 24 will have contained complete equilibrium between the gas and liquid phase with respect to the VOGs contained well water pool 24, the spraying of contaminated water from dispersion head 45 into the air or gas of head area 30 provides a second opportunity for equilibrium to be maintained with respect to the partition of VOCS between the gas and liquid phases which are present within well 5. In this manner, the present invention achieves greater extraction efficiency than can be, obtained by systems which only use in-well air stripping or in-well air sparging techniques for elimination of VOCs from contaminated groundwater.

Figure 3:
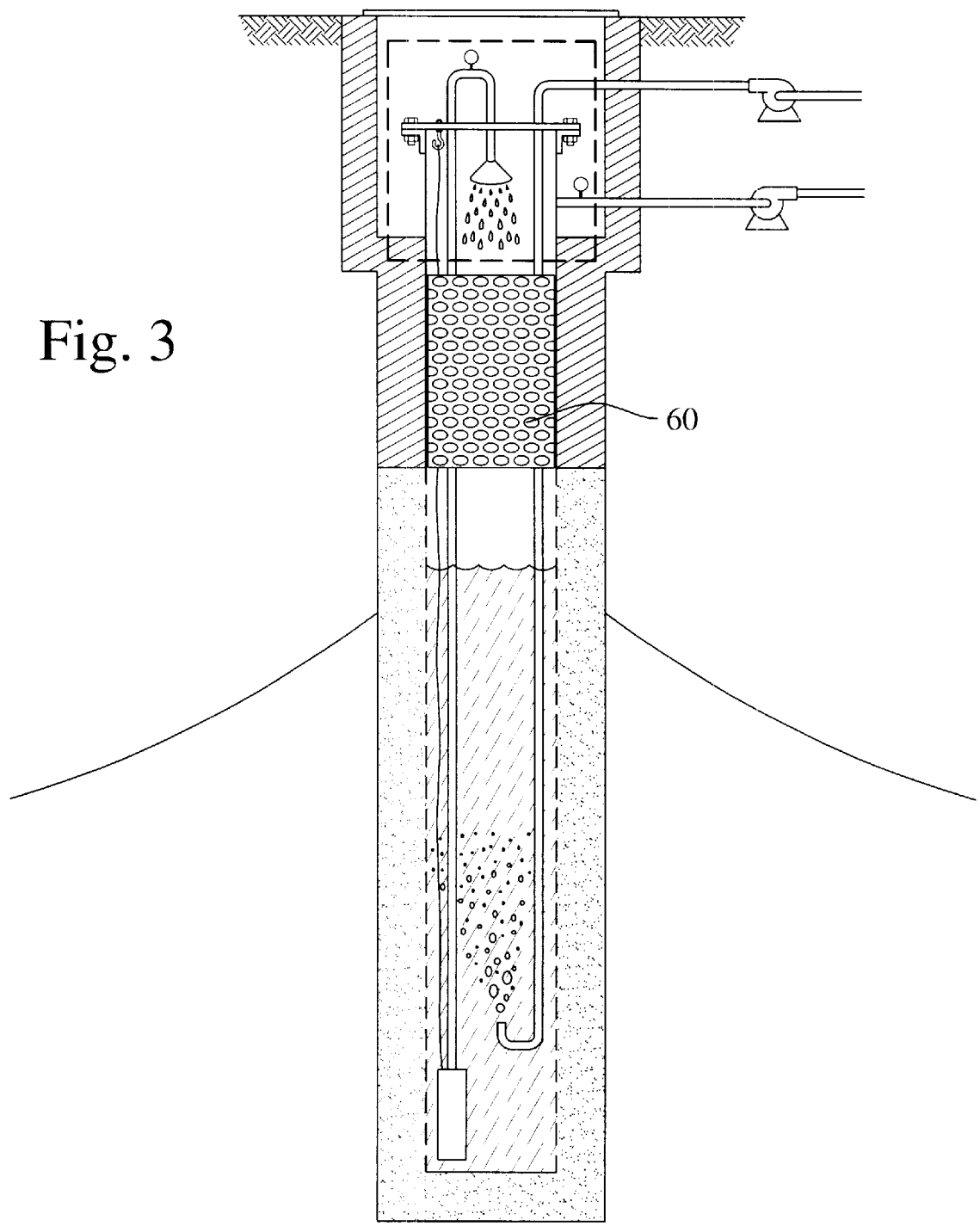
FIG. 3 is an elevation view of the water well of FIG. 1 and showing the inclusion of a well packing material in the casing.

Referring now to FIG. 3 the operation of the present invention can be modified by the insertion of packing material 60 into the head area of well casing 12. Such packing materials can be used to act as catalysts to increase water surface for more effective VOCs stripping. One type of packing that is widely used is round objects such as plastic spheres. In operation, the water spreads over the surface of the spheres and the amount of water surface area which is exposed to air is substantially increased thereby increasing the efficiency of the process.

An operational example of the present invention will now be presented. The inventive method of apparatus were employed at a site in which tetrachloroethylene, a polychloroethene, (PCE) was found in both soil and in ground water. At the site at the time of installation of the inventive apparatus, the highest level of PCE detected was a level of 2700 pbb. A well was installed approximately 18 feet upgradient of a monitoring well and the well was extended to approximately 20 feet below the ground water table. The submersible pump was placed into the well at a depth of approximately 20 feet below the ground water table. At the time just prior to the installation of the well utilizing the inventive technology, the PCE concentration was approximately 2700 pbb and dissolved oxygen concentrations were approximately 1.23 pbm.

The present invention including the air stripping and air sparging technologies was operated for 13 days. At the end of 13 days testing was again conducted. The PCE concentrations after 13 days of operation of the present invention were reduced to 240 pbb (approximately a 90% reduction) and dissolved oxygen concentrations increased to approximately 9.57 pbm (almost saturation level). Tetrachloroethylene (TCE) and dichloroethylene (DCE) concentrations were detected at levels of up to 250 pbb and 110 pbb respectively prior to treatment. After treatment the TCE and DCE concentrations were reduced to below-detectable levels.

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted a limiting, but merely as a basis for the claims and as a representative basis for teaching one skilled in the art to variously employ the present invention in virtually any appropriately detailed structure.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

It is also to be understood that the following claims are intended to cover all of the generic and specific features of the invention herein described, and all statements of the scope of the invention which, as a matter of language, might be said to fall there between.

Having thus described the invention, what is claimed as new and desired to be secured by Letters Patent is as follows:

1. A water remediation apparatus for use within an in-ground water well, the well having a casing, a well head area, contaminated water therein, the apparatus comprising:

a pump submerged in the contaminated water, a pipe having a first end and a second end said first end connected to said pump and said second end located near the top of the well casing, a nozzle attached to said pipe second end to spray pumped contaminated groundwater into the well head area, a pressurized gas source, a gas injection line connected to said gas source, a gas bubbler head submerged in the contaminated water, said head attached to said injection line, said bubbler head releasing small gas bubbles into said contaminated water, and a low pressure vent for removing gas from the well head.

2. The apparatus as claimed in claim 1 further comprising a packing material disposed in the head area.

3. A water remediation apparatus for use within an in-ground water well, the well having a casing, a well head area and a contaminated water pool therein, the apparatus comprising:

a pump disposed in the contaminated water pool, a spray nozzle attached to said pump to spray pumped contaminated groundwater into the well head area, a gas injector disposed in said contaminated groundwater for bubbling a gas into the contaminated groundwater; and p1 a gas vent in the well casing to remove gas from the well casing.

4. The apparatus as claimed in claim 3 further comprising a packing material disposed in the head area.

5. A water remediation apparatus for use within an in-ground water well, the well having a casing, a well head area and a contaminated water pool therein, the apparatus comprising:

a pump disposed in the contaminated water pool, a spray nozzle attached to said pump to spray pumped contaminated groundwater into the well head area, and a gas vent in the well casing to remove gas from the well casing.

6. The apparatus as claimed in claim 5 further comprising a packing material disposed in the head area.

7. A method of removing volatile contaminates from groundwater contained in an in-ground water well, the well having a casing, a well head area and a contaminated water pool therein the method comprising:

spraying contaminated groundwater from the contaminated water pool well into the well head area, and removing gas from the well head area.

8. The method as claimed in claim 7 further comprising the step of installing a packing material in the head area.

9. A method of removing volatile contaminates from groundwater contained in an in-ground water well, the well having a casing, a well head area and a contaminated water pool therein the method comprising:

spraying contaminated groundwater from the contaminated water pool well into the well head area, injecting gas bubbles into the contaminated water pool; and removing gas from the well head area.

10. The method as claimed in claim 9 further comprising the step of installing a packing material in the head area.

* * * * *

UNITED STATES PATENT AND TRADEMARK OFFICE
CERTIFICATE OF CORRECTION

PATENT NO.    : 6,557,633 B2
DATED         : May 6, 2003
INVENTOR(S)   : Abouodah, Mohamed It is certified that error appears in the above-identified patent and that said Letters Patent is hereby corrected as shown below:

<u>Column 7,</u>
Line 25, delete the phrase "p1"

Signed and Sealed this

Ninth Day of September, 2003

JAMES E. ROGAN
*Director of the United States Patent and Trademark Office*